(12) United States Patent
Diamant et al.

(10) Patent No.: US 10,303,621 B1
(45) Date of Patent: May 28, 2019

(54) DATA PROTECTION THROUGH ADDRESS MODIFICATION

(71) Applicant: AMAZON TECHNOLOGIES, INC., Seattle, WA (US)

(72) Inventors: Ron Diamant, Albany, CA (US); Alex Levin, Cupertino, CA (US); Barak Wasserstrom, Mitzpe Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 15/452,117

(22) Filed: Mar. 7, 2017

(51) Int. Cl.
G06F 21/00 (2013.01)
G06F 12/14 (2006.01)
G06F 12/02 (2006.01)
G06F 15/78 (2006.01)

(52) U.S. Cl.
CPC ...... G06F 12/1408 (2013.01); G06F 12/0246 (2013.01); G06F 15/7807 (2013.01); G06F 2212/1052 (2013.01); G06F 2212/7201 (2013.01)

(58) Field of Classification Search
None
See application file for complete search history.

(56) References Cited

U.S. PATENT DOCUMENTS

| | | | | |
|---|---|---|---|---|
| 2003/0133574 A1* | 7/2003 | Caronni | | G06F 12/1408 380/277 |
| 2004/0221126 A1* | 11/2004 | Peinado | | G06F 21/79 711/203 |
| 2005/0033973 A1* | 2/2005 | Kamada | | G06F 12/145 713/193 |
| 2005/0081015 A1* | 4/2005 | Barry | | G06F 9/30174 712/1 |
| 2007/0028074 A1* | 2/2007 | Khosravi | | G06F 12/1009 711/206 |
| 2007/0130441 A1* | 6/2007 | Wooten | | G06F 12/1027 711/203 |
| 2008/0126751 A1* | 5/2008 | Mizrachi | | G06F 9/485 712/30 |
| 2009/0037682 A1* | 2/2009 | Armstrong | | G06F 12/1475 711/164 |
| 2010/0211827 A1* | 8/2010 | Moyer | | G06F 11/3636 714/45 |
| 2013/0091568 A1* | 4/2013 | Sharif | | G06F 21/50 726/22 |

(Continued)

Primary Examiner — Shin-Hon (Eric) Chen
(74) Attorney, Agent, or Firm — Blank Rome LLP

(57) ABSTRACT

An electronic system includes a secret value (e.g., an encryption key) which is used for its intended purpose after which the address translations in the system's memory management unit are modified to prevent further access to the secret value. The address translation modifications also include modification of a translation for the memory management unit itself thereby preventing further modification of the address translations. The secret value cannot again be accessed until the system is reinitialized, but the address translations are modified during each system initialization so that the secret value is only usable for its intended purpose during the initialization process. In other implementations, the system modifies mappings between physical addresses and hardware components to preclude further access to the secret value.

19 Claims, 5 Drawing Sheets

(56) References Cited

U.S. PATENT DOCUMENTS

| | | | |
|---|---|---|---|
| 2014/0258674 A1* | 9/2014 | Kim | G06F 12/1027 |
| | | | 711/204 |
| 2016/0315874 A1* | 10/2016 | Medovich | G06F 12/1009 |
| 2016/0371496 A1* | 12/2016 | Sell | G06F 9/45558 |
| 2017/0097781 A1* | 4/2017 | Reimers | G06F 3/0616 |
| 2017/0168963 A1* | 6/2017 | Jaeger | G06F 12/1475 |
| 2017/0185345 A1* | 6/2017 | Lim | G06F 3/0622 |
| 2017/0286326 A1* | 10/2017 | Guim | G06F 12/1009 |
| 2018/0173645 A1* | 6/2018 | Parker | G06F 12/14 |

\* cited by examiner

DATA PROTECTION THROUGH ADDRESS MODIFICATION

BACKGROUND

Some electronic devices include "secret" values that are used for a specific purpose. Such values are secret in that they are to be used only for their designated purpose and should not be accessible by unauthorized entities. One example of such a device is an integrated circuit that includes an encryption key that is usable to decrypt a software image that then executes on the device. The software image is decrypted using the encryption key and the decrypted software image then may be executed to implement the device's functionality. In the hands of an unauthorized entity, the encryption key could be used to improperly modify the software image.

BRIEF DESCRIPTION OF THE DRAWINGS

For a detailed description of various examples, reference will now be made to the accompanying drawings in which.

DETAILED DESCRIPTION

Figure 1:
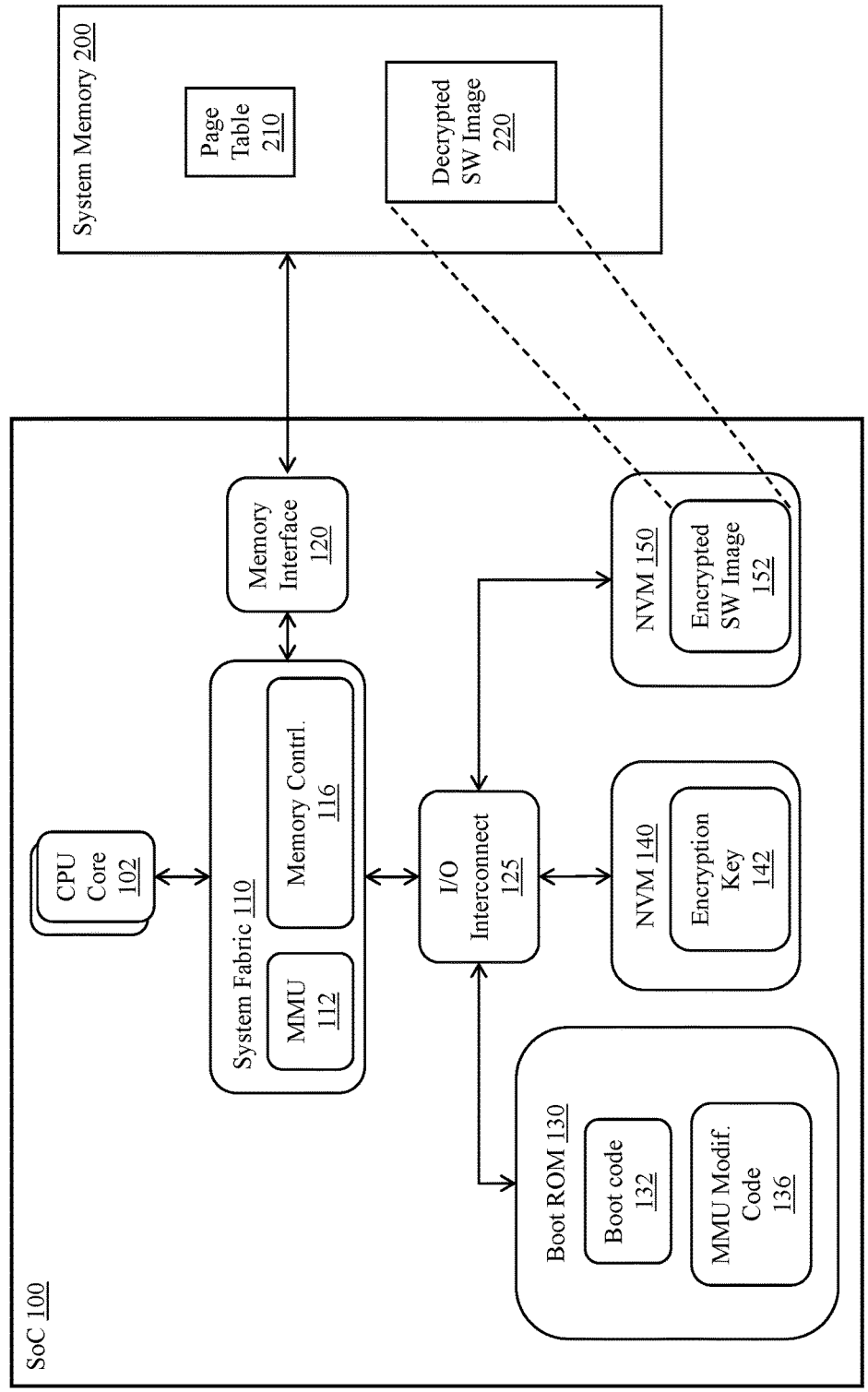
FIG. 1 shows a system in accordance with various examples.

In accordance with the disclosed embodiments, an electronic system includes a configurable memory management unit (MMU) that, in some embodiments, stores translations between virtual addresses and physical addresses and, in other embodiments maps physical addresses to corresponding hardware components within the electronic system. Software executing with the electronic system is configured to access memory using virtual addresses. In embodiments in which the MMU includes address translations, the MMU translates the virtual addresses contained in the memory access requests to the corresponding physical addresses and then forwards the memory access requests to the target device using the physical addresses. One of the devices comprising the electronic system may include a non-volatile memory (NVM) that stores a secret value (or a plurality of secret values). The secret value may be used for any of a variety of purposes. In one example, the secret value includes an encryption key. Another NVM included within the electronic system may store an encrypted software image which can be decrypted using the encryption key. Once decrypted, the software image can be executed by a processor in the electronic system. If the encryption key were to be accessible, an unauthorized entity could modify a portion of the software image to include malware (e.g., a virus) or other harmful data or executable code, encrypt the modified software image and store the modified and re-encrypted software image back into its NVM. Operation of the electronic system could then be modified to suit the desires of the unauthorized entity.

In accordance with the disclosed embodiments, following permitted use of the secret value (e.g., an encryption key used to decrypt the encrypted software image), the MMU is modified to prevent the secret value from being further accessible. For example, the virtual-to-physical address translation in the MMU for the NVM containing the secret value can be modified so that the secret value to which the translation pertains is no longer addressable. In one embodiment, the virtual address within the virtual-to-physical address translation for the base address of the secret value's NVM is replaced with a replacement virtual address that is of a length that is longer than the address bus in the electronic system. For example, the electronic system may include a 40-bit address bus which permits virtual addresses up to a maximum value of $2^{40}$. The replacement virtual address may have a value that exceeds $2^{40}$ (e.g., a value that is greater than or equal to $2^{40}+1$). With the address mapping for the secret value mapping a virtual address that is incompatible with the address bus, no logic in the electronic system will be able to access the secret value—that is, no virtual address submitted to the MMU can match the replacement virtual address in the modified translation. All references herein to modification of a virtual or physical address include modification of a single address or a range (window) of addresses.

To guard against an unauthorized entity subsequently reconfiguring the MMU to modify the translation for the secret value back to its former value (or another value that can be accessible via the system's address bus), the virtual-to-physical address translation of the base address of the MMU itself is modified in a similar fashion—that is, to replace its virtual address with a virtual address that is of a length that is incompatible with the address bus. With these modifications made to the MMU's translations, the secret value cannot be accessed nor can the MMU's configuration be modified.

In other embodiments, rather than modifying the virtual addresses in the MMU translations, the physical addresses are modified. The modified physical addresses may result in access of a value that is not the intended value (i.e., a dummy value). As such, a memory read access of the secret value will result in a returned read value, but that value will not be the secret value, and any attempt to reconfigure the MMU registers will result in a write transaction to a portion of system memory, and not the MMU registers.

In the embodiment in which the MMU maps physical addresses directly to hardware components and the hardware components are thus accessible via access requests that contain the physical addresses, the MMU's mapping of the NVM containing the secret value (e.g., the encryption key) is modified so that the physical address is beyond the size capability of the address bus. That is, the physical address corresponding to the secret value's NVM may be modified to a value that is too large to be accessible given the size of the address. Further, the mapping of physical addresses to the hardware components is contained in a look-up table (or other suitable data structure) that itself is accessed for modification using a physical address mapped to the look-up table. The look-up table's physical address mapping also may be modified to be a physical address value that is larger than the capabilities of the address.

FIG. 1 shows an example of an electronic system in the form of a system-on-chip (SoC) 100 containing various hardware components. The SoC 100 in the example of FIG. 1 includes one or more central processing unit (CPU) cores 102, a system fabric 110, a memory interface 120, an input/output (I/O) interconnect 125, a boot read only memory (ROM) 130, and non-volatile memory devices 140 and 150. The SoC 100 may comprise an integrated circuit. In some embodiments, these components may be provided on a common integrated circuit. In other embodiments, a system containing the components shown as part of the SoC 100 may contain multiple semiconductor dies, each die containing one or more of the components shown. In some embodiments, whether the components are formed on a single die or multiple dies, all of the components may be packaged together in a single package. In yet other embodiments, two or more of the components may be packaged separately (i.e., separate chips).

The memory interface 120 may be configured to be connected to a system memory device 200. One or more or all of the CPU cores 102, or other types of memory access source devices, can issue memory access requests to the system memory 200 through the system fabric 110. The system fabric 110 may comprise a memory management unit (MMU) 112 and memory controller 116. As will be explained below, the MMU 112 contains a plurality of translations between virtual addresses and physical addresses. The memory access requests (e.g., reads, writes, etc.) of the machine instructions executed by the CPU cores 102 may include virtual addresses, which are translated into physical addresses by the MMU 112. The memory controller 116 may include a storage buffer (e.g., a queue) into which memory access requests can be stored pending their execution. The memory controller 116 may employ any suitable arbitration logic to determine which memory access requests to execute at any given point in time.

The I/O interconnect 125 provides interface connectivity between the CPU cores 102 and various peripheral devices such as the boot ROM 130, the non-volatile memory (NVM) devices 140 and 150, as well as any other peripheral devices to be implemented as part of the SoC 100 (e.g., Ethernet controllers, security accelerators, etc.).

The boot ROM 130 may be pre-configured to store boot code 132 as well as MMU modification code 136. The boot code 132 comprises machine instructions that are executable by one or more of the CPUs 102. The boot code 132 may perform one or more functions such as a power-on self-test (POST) process in which various devices, such as memory, are tested, error codes checked, etc.

The NVM device 150 includes an encrypted software image 152. The software image may contain an operating system, drivers, configuration parameters, and one or more applications that are executable by the CPU cores 102. The applications perform whatever operations are desired for the SoC. The boot code 132, or other code (not shown) that executes after the boot code completes, may decrypt the encrypted software image 152 and store the decrypted software image to memory (shown as decrypted software image 220). The CPU cores 102 execute the machine instructions in the decrypted software image (e.g., the operating system, applications, etc.) 220 from system memory 200, rather than from the NVM device 150.

The encrypted software image 152 may be decrypted using an encryption key 142 stored in the NVM device 140. The encryption key 142 may be prestored in the NVM 140 or may be computed by one of the CPU cores during system initialization. The boot code 132, or other code that performs the decryption, accesses the encryption key from the NVM device 140 and performs a decryption process using the encryption key 142 to decrypt the encrypted software image 152.

Access to the encryption key 142 may include a CPU core 102 issuing a read transaction for the encryption key. The read transaction instruction includes the virtual address of the encryption key. The read transaction, with the encryption key's virtual address, is received by the MMU 112. In some embodiments, the MMU 112 comprises multiple registers, with each register configured with a translation between a virtual address (or range of virtual addresses) and a corresponding physical address. For the virtual address-to-physical address (VA-to-PA) translation for the encryption key, the corresponding physical address may be a physical address of the NVM 140 at which the encryption key 142 is located. The MMU receives the read request, accesses the register containing the virtual address from the read request, replaces the virtual address in the read request with the corresponding physical address, and forwards the modified read request to the NVM 140 for retrieval of the data at the specified physical address (the encryption key 142 in this case).

Figure 2:
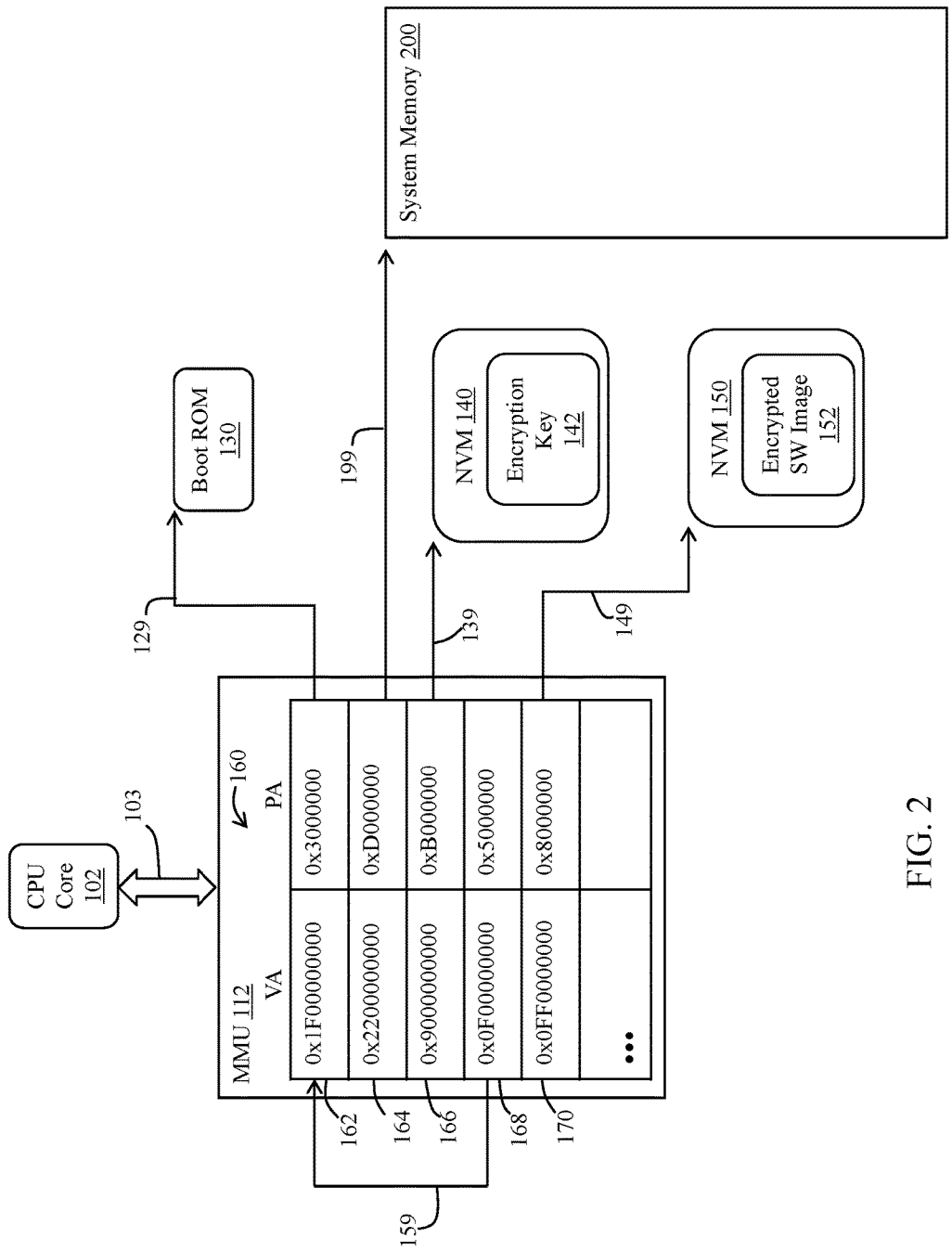
FIG. 2 illustrates the operation of a memory management unit in accordance with various examples.

FIG. 2 shows an example of the MMU 112. A CPU core 102 is shown coupled to the MMU 112 over a bus 103. The bus 103 may be, or may include, an address bus of a specified length (i.e., number of bits). For example, the address bus may be a 40-bit address bus which can accommodate virtual addresses ranging from 0 to $2^{40}$. FIG. 2 also shows the boot ROM 130, the NVM 140 containing the encryption key 142, the NVM 150 containing the encrypted software image 152, and system memory 200.

The MMU 112 includes a register set 160 including registers 162, 164, 166, 168, and 170, and may contain additional registers as well. Each register 162-170 maps a virtual address (VA) to a corresponding physical address (PA). The physical addresses (PA) are specific to individual hardware components within the SoC 100. For example, the physical address 0x3000000 of register 162 may be the base address of the boot ROM 130 as indicated by arrow 129. The physical address 0xD000000 of register 164 may be the base address of the system memory 200 as indicated by arrow 199. The physical address 0xB000000 of register 166 may be the base address of the NVM 140 as indicated by arrow 139. The physical address 0x8000000 of register 170 may be the base address of the NVM 150 as indicated by arrow 149. Finally, the physical address 0x5000000 of register 166 may be the base address of the MMU 112 itself as indicated by arrow 159. In some embodiments, each register 162-170 may specify a range of virtual and corresponding physical addresses.

In the example of FIG. 2, for the CPU core 102 to access the code in the boot ROM 130 (e.g., the boot code 132, MMU modification code 136), the CPU core issues an access request (e.g., a fetch instruction) containing the virtual address of the target machine instruction from the boot ROM 130. The virtual address may be 0x1F00000000 and the MMU translates the virtual address to the corresponding physical address 0x3000000 and thus forwards the request to the boot ROM 130. Similarly, any system memory access request which contains a virtual address equal to 0x2200000000 or in a range of virtual addresses defined by register 164 is modified to replace the virtual address with the corresponding physical address 0xD000000 (or another physical address defined by the register 164). Further, accesses for the NVMs 140 and 150 contain a virtual address including 0x9000000000 or 0x0FF0000000, respectively. These virtual addresses are replaced by the MMU 112 with their corresponding physical addresses 0xB000000 or 0x8000000 from registers 166 and 170, respectively, and the resulting modified access requests are forwarded on to the respective NVM 140 or 150.

Register 168 contains a VA-to-PA translation for the MMU register set 160. This particular translation is useful to change the contents of any of registers 162-170. For example, to change the translation for the boot ROM 130, the virtual address in register 162 may be written with a replacement virtual address. The illustrative virtual address in register 168 is 0xF000000000 and the corresponding physical address is 0x5000000.

In accordance with the disclosed embodiments, the encryption key 142 (or other type of secret value desired to be protected from unauthorized access) is used for its intended and legitimate purpose after which the corresponding VA-to-PA translation in the MMU 112 may be modified to thereby prevent further access to the encryption key. Multiple embodiments are described below for modifying the translation for the encryption key included in register 166 and include (a) modifying the virtual address, but not necessarily the physical address, and (b) modifying the physical address, but not necessarily the virtual address.

Figure 3:
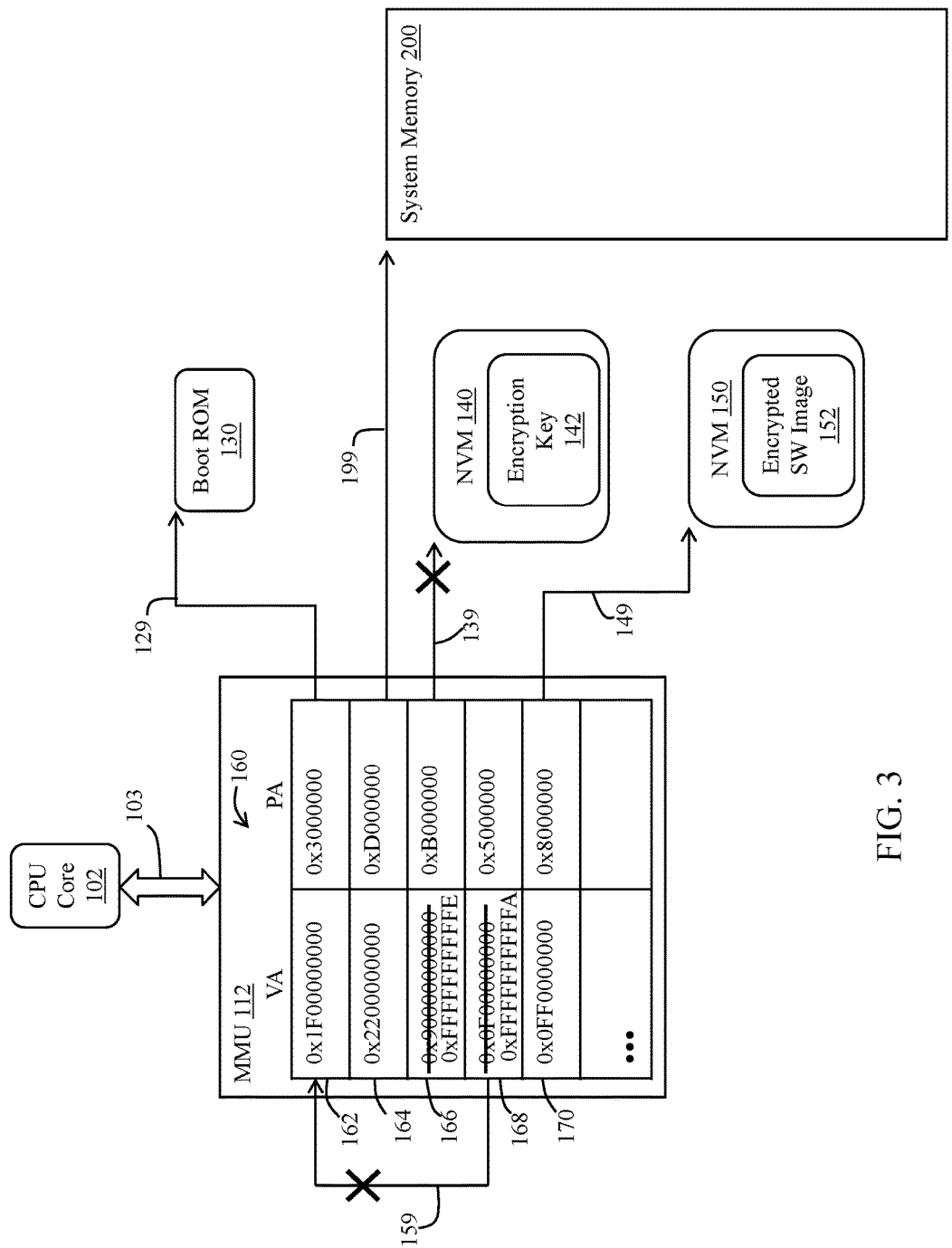
FIG. 3 shows an example of the modification of the memory management unit to prevent unauthorized access to the secret value in accordance with an embodiment.
Figure 4:
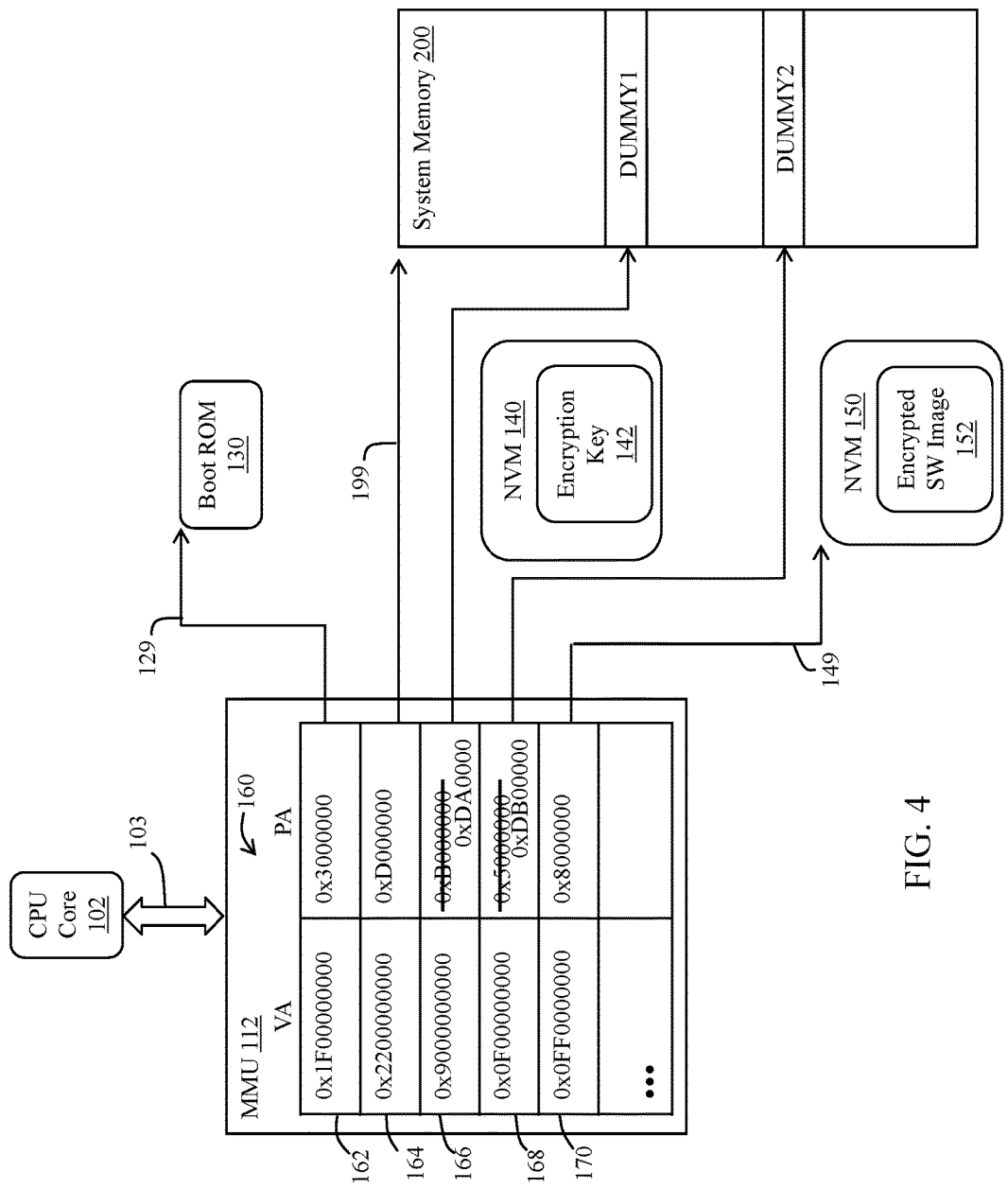
FIG. 4 shows another example of the modification of the memory management unit to prevent unauthorized access to the secret value in accordance with an example.

Once the VA-to-PA translation of register 166 is modified, it may be possible for an unauthorized entity to perform a write transaction to the MMU 112 to modify the contents of register 166 back to its former value to thereby again render the encryption key 142 accessible. Thus, the disclosed embodiments also include modifying the VA-to-PA translation contained in register 168 so that the MMU register set 160 is no longer accessible from further reconfiguration. At this point, the encryption key 142 is inaccessible and the MMU 112 cannot be modified to again provide a correct address translation for the encryption key. FIGS. 3 and 4 show two embodiments for modifying the MMU to preclude access to the encryption key 142.

FIG. 3 shows an example in which modifications are made to the virtual addresses in the MMU 112 after the encryption key 142 is accessed and successfully. The modifications are made in order to block future access to the encryption key so that unauthorized uses of the encryption key cannot be made. The components of FIG. 3 are the same as that shown in FIG. 2. Two virtual addresses have been modified in the MMU 112 in this example—the virtual address of the encryption key 142 and the virtual address base address of the MMU register set 160. Both virtual addresses, in the disclosed embodiments, are modified to include replacement virtual addresses that exceed a length of the address bus over which the CPU core 102 is configured to submit memory access requests to the MMU 112. For example, if the address bus (comprising or included within bus 103) is a 40-bit bus which permits a highest virtual address of $2^{40}$, the replacement virtual address should be greater than $2^{40}$ (i.e., at least $2^{40}+1$).

The virtual address of the encryption key 142 has been changed from 0x9000000000 to 0xFFFFFFFFFE which is a 44-bit value that is larger than the 40-bit width capacity of the address bus. To access the encryption key 142 at this point, an access request would have to include the replacement virtual address 0xFFFFFFFFFE to have it converted to the correct physical address 0xB000000, but no such virtual address can be included in the request because the address bus is not wide enough to accept the 44-bit virtual address. Further, any access request attempt using the encryption key's former virtual address (0x9000000000) will not result in a translation to the correct physical address for the encryption key. In the example of FIG. 3, the MMU's register set no longer includes the encryption key's former virtual address (0x9000000000) and thus any access request containing that particular virtual address will result in a memory error generated by the MMU 112.

The example of FIG. 3 also shows that the virtual address for the base of the MMU register set has been changed from the 40-bit address 0xF000000000 to the 44-bit address 0xFFFFFFFFFA. As was the case for the modification to the address translation in register 166 for the encryption key 142, the modification to the virtual address for the base of the MMU register set has been changed to a value that is incompatible with the SOC's 40-bit address bus thereby rendering the MMU register incapable of being further modified. The inability to access the encryption key 142 and to make further changes to the MMU registers is illustrated by the X's in FIG. 3.

To modify the virtual address for the encryption key, an instruction (e.g., a machine instruction) causes a CPU core 102 to perform a write transaction to the MMU at the address corresponding to register 166. The virtual address in the write transaction may comprise the virtual address of the base of the register set 160 along with an offset to the register 166. Once the virtual address for the encryption key translation is modified as illustrated above, another write transaction is performed to the MMU to replace the virtual address associated with the base of the register set 160. This latter write transaction may comprise the virtual address of the base of the register set 160 along with an offset to the register 168. Any subsequent instruction attempting to change the configuration of the register set 160 (e.g., to change the virtual addresses in registers 166 or 168) will fail because such an instruction would need to include the replacement virtual address in register 168 and that virtual address is compatible with the SoC's address bus. Further, any attempted use of the former virtual address in register 168 will result in a memory failure because the former virtual address (0xF000000000) no longer exists in the MMU address translations.

FIG. 4 illustrates the example noted above in which the physical addresses corresponding to the encryption key 142 and the base of the MMU register set 160 are modified. The modifications to the MMU configuration replace the physical addresses of the encryption key and the base of the register set 160 with different, but valid, physical addresses, that is physical addresses that are associated with another part of the memory space in the SoC. In the example of FIG. 4, the replacement physical address for the encryption key is 0xDA00000 and the replacement physical address for the register set base is 0xDB00000. Both of these replacement addresses are associated with a location in system memory 200 as shown. The data value at each such location comprises a value other than the encryption key 142 and a location within the register set 160. The data values at the locations pointed to by the replacement physical addresses may be referred to as "dummy" values, DUMMY 1 and DUMMY2. The physical address for the encryption key may be modified before modifying the physical address of the base of the register set 160.

Any attempt to read the encryption key 142 using the correct virtual address (i.e., 0x9000000000 in the example of FIG. 4) will not result in the return of the encryption key, and instead will result in the return of the DUMMY1 data value. Similarly, any attempt to further modify the MMU translations (e.g., to modify the physical address in the translation of register 166 back to the physical address of the encryption key 142 in NVM 140) will fail to modify any of the MMU translations.

Referring again to FIG. 1, in accordance with at least some embodiments, the BIOS code 132 may execute to perform a system initialization (e.g., POST) and to use the encryption key 142 to decrypt the encrypted software image 152. Following the authorized use of the encryption key 142, the MMU modification code 136 may execute to modify the virtual or physical addresses as illustrated above to render the encryption key (or other secret value) inaccessible. In some implementations, the BIOS code 132 may include a pointer to a particular memory location in which the next instruction is to be executed. In some systems, that location may be the beginning of the operating system included as part of the decrypted software image 220. In accordance with the disclosed embodiments, however, the location may be the first machine instruction of the MMU modification code 136. After the MMU modification code 136 completes its execution and has modified the MMU translations to render the encryption key inaccessible, execution control may pass to the operating system to boot the operating system.

In the embodiments of FIGS. 2-4, the MMU 112 includes VA-to-PA address translations which can be modified as in various ways as described above to preclude further access to the secret value being protected. In other embodiments, as noted above, the MMU includes a look-up table that maps physical addresses, or ranges of physical addresses, to the hardware components of SoC 100 (e.g., boot ROM 130, NVM 140, NVM 150, system memory 300, and the MMU itself). In this embodiment, the modifications may be made to (a) the mapping to the NVM 140 that contains the encryption key 142 (or whatever hardware component stores the secret value to be secured) and (b) to the mapping for the MMU itself to prevent further modifications to the MMU. The look-up table may be stored in registers or another type of storage medium. The modifications include, for example, replacing the physical address (or range of physical addresses) with a physical address (or range of physical addresses) that are larger than the capability of the bus 103.

Figure 5:
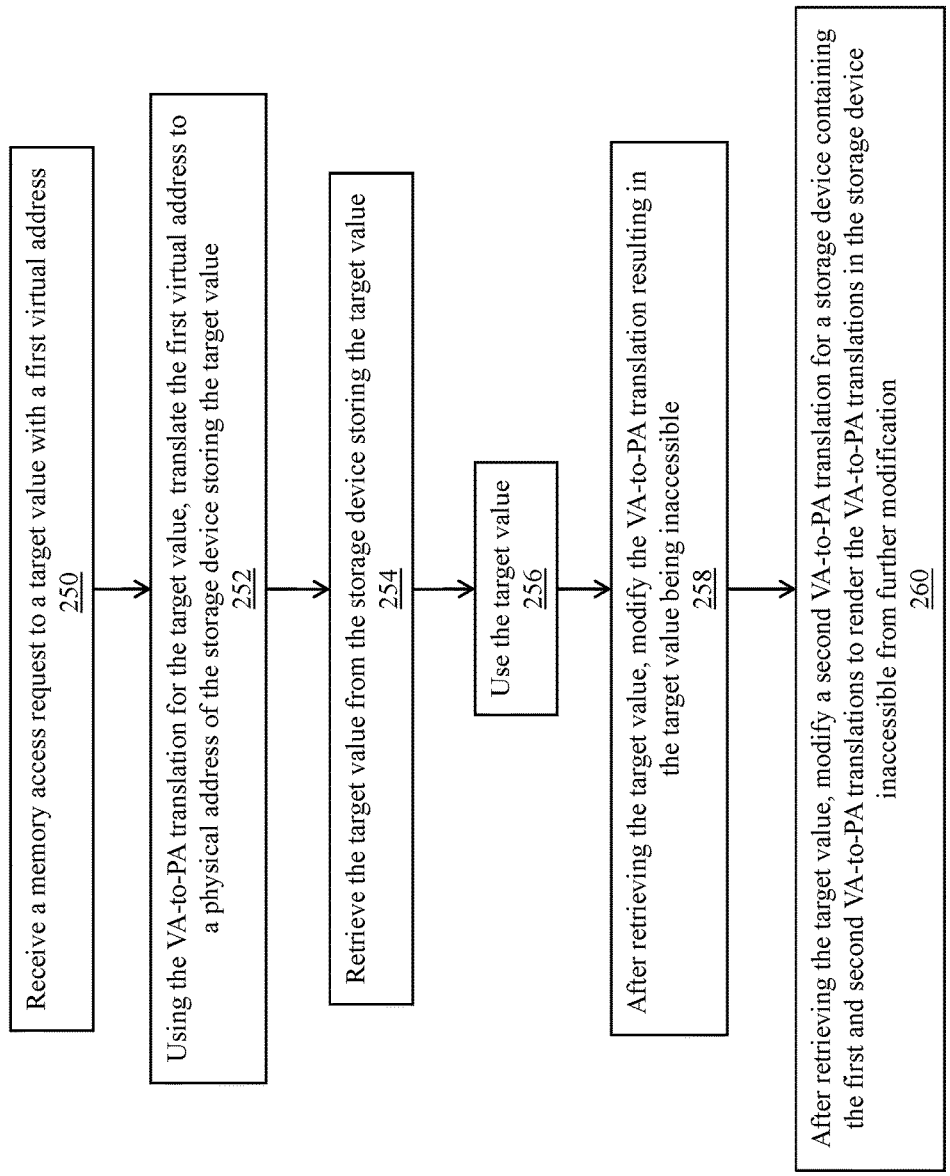
FIG. 5 shows a method in accordance with various examples.

FIG. 5 illustrates a method comprising operations 250-260. The operations may be performed in the order shown or in a different order. Further, the operations may be performed sequentially or two or more of the operations may be performed concurrently. At 250, the method comprises receiving a memory request to a target value. The memory request includes a first virtual address. The target value may comprise an encryption key or another type of value to be protected. The first virtual address may be preconfigured into the machine instruction comprising the memory access request.

At 252, the method includes using a VA-to-PA translation for the target value to translate the first virtual address to a physical address for a storage device that stores the target value. In some implementations, an MMU may be used to translate the virtual address to the physical address. The address translations, however, can be implemented in types of circuits as well such as translation lookaside buffers (TLBs).

At 254, the method includes retrieving the target value from the storage device that contains the target value using the physical address resulting from the address translation. This operation may include, for example, retrieving an encryption key. At 256, the retrieved target value may be used for its intended purpose. For example, if the target value is an encryption key, the encryption key may be used to decrypt an encrypted set of data (e.g., an encrypted software image) or encrypt plaintext data.

At 258, after retrieving the target value, the method includes modifying the VA-to-PA used in operation 252 for the address translation of the target value to result in the target value no longer being accessible. The modification may be to modify the virtual address within the translation or the physical address as explained above. Similarly, at 260, the VA-to-PA translation to access to the translation circuit itself (e.g., to reconfigure the translation circuit) is modified to thereby render the translation circuit inaccessible for further modification.

In another method embodiment, the memory access request includes a physical address of the target value and the MMU does not contain VA-to-PA address translations. Instead, the mapping in the MMU for the specified physical address is used to forward the request to the hardware component corresponding to the physical address. The target value is retrieved from the hardware component and used (e.g., to decrypt a software image). The MMU physical address mappings then are modified to preclude further access to the target value and to preclude further modification of the MMU physical address-to-hardware component mappings.

In some embodiments, the CPU cores include virtual addresses in their access requests, but the MMU may not translate the virtual addresses to physical addresses. Instead, the destination hardware component that receives the request from the MMU may perform the virtual address to physical address translation. In this embodiment, there is still a mapping between virtual addresses and hardware components and some of those mappings may be modified as described above.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system-on-chip (SoC), comprising:
 a central processing unit (CPU) core;
 a first non-volatile memory configured to store an encryption key usable in a decryption operation; and
 a second non-volatile memory configured to store an encrypted software image;
 a memory management unit (MMU) coupled to the CPU core and comprising a first register and a second register, wherein the first register is configured to store a virtual address-to-physical address translation for the encryption key and the second register is configured to store a virtual address-to-physical address translation for the MMU;
 wherein the CPU core is configured to:
 execute boot code to decrypt the encrypted software image using the encryption key;
 replace a first address in the first register so that the encryption key is no longer usable for decryption; and replace a second address in the second register so that the first and second registers in the MMU are not modifiable.

2. The SoC of claim 1, wherein the CPU core initiates a boot of an operating system after replacement of the first and second addresses in the first and second registers, respectively.

3. The SoC of claim 1, wherein the first address comprises a virtual address.

4. The SoC of claim 3, wherein the CPU core replaces the first address with a replacement virtual address that exceeds a length of an address bus over which the CPU core is configured to submit memory access requests to the MMU.

5. The SoC of claim 1, wherein the first and second addresses comprise virtual addresses.

6. The SoC of claim 1, wherein the first address or the second address comprise a physical address.

7. An apparatus, comprising:
one or more central processing unit (CPU) cores;
a first non-volatile memory configured to store a value comprising an encryption key;
a second non-volatile memory configured to store an encrypted software image; and
a memory management unit (MMU) coupled to the one or more CPU cores and configured to distribute access requests from the one or more CPU cores to hardware devices within the apparatus;
wherein the one or more CPU cores are configured to:
read the encryption key from the first non-volatile memory and to decrypt the encrypted software image using the encryption key; and
after using the encryption key, reconfigure the MMU so that the encryption key is no longer retrievable and so that the MMU is no longer modifiable.

8. The apparatus of claim 7, wherein:
the MMU includes a first register and a second register, wherein the first register is configured to store a virtual address-to-physical address translation for the value and the second register is configured to store a virtual address-to-physical address translation for the MMU;
after using the value, the one or more CPU cores are configured to replace a first address in the first register so that the value is no longer retrievable; and
the one or more CPU cores are configured to reconfigure the MMU through replacement of a second address in the second register so that the first and second registers in the MMU are not modifiable.

9. The apparatus of claim 8, wherein the first address comprises a virtual address.

10. The apparatus of claim 9, wherein the one or more CPU cores couples to the MMU using an address bus of length N bits, and wherein the one or more CPU cores are configured to replace the first address with a replacement virtual address of a length that is greater than N.

11. The apparatus of claim 9, wherein the second address comprises a virtual address.

12. The apparatus of claim 8, wherein the first address comprises a base physical address of the first non-volatile memory, and wherein the one or more CPU cores are configured to replace the base physical address in the first register with a replacement physical address to a location that does not contain the value.

13. The apparatus of claim 8, wherein each of the first and second addresses comprises a physical address.

14. The apparatus of claim 7, wherein the one or more CPU cores are configured to:
reconfigure the MMU through modification of a physical address or range of physical addresses mapped to a hardware component storing the value.

15. The apparatus of claim 7, wherein the apparatus comprises an integrated circuit.

16. A method, comprising:
receiving, from a source device, a memory access request to a target value, the memory access request containing an address;
distributing the memory access request to a storage device storing the target value;
retrieving the target value from the storage device;
after retrieving the target value, modifying a mapping to the storage device thereby resulting in the target value being inaccessible, the mapping comprising a first virtual address-to-physical address translation and modifying the mapping includes modifying the first virtual address-to-physical address translation;
after retrieving the target value, modifying a second virtual-to-physical address translation which includes a translation to access a storage device containing the first and the second virtual-to-physical address translations to thereby render the virtual-to-physical address translations in the storage device inaccessible from further modification.

17. The method of claim 16, wherein modifying the first and second virtual-to-physical address translations comprises modifying a virtual address or a physical address for each of the first and second virtual-to-physical address translations.

18. The method of claim 16, wherein modifying the first virtual-to-physical address translation comprises replacing a virtual address in the first virtual-to-physical address translation with a different virtual address that comprises a length that exceeds a virtual address capacity of memory access requests of the source device.

19. The method of claim 16, wherein modifying the mapping to the storage device comprises modifying a physical address or range of physical addresses corresponding to the storage device.

* * * * *